United States Patent
Tsuda et al.

(10) Patent No.: US 12,222,288 B2
(45) Date of Patent: Feb. 11, 2025

(54) BIOLOGICAL COMPONENT MEASUREMENT APPARATUS

(71) Applicant: Mitsubishi Electric Corporation, Tokyo (JP)

(72) Inventors: Yuki Tsuda, Tokyo (JP); Koichi Akiyama, Tokyo (JP); Shusaku Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 311 days.

(21) Appl. No.: 17/790,508

(22) PCT Filed: Mar. 4, 2020

(86) PCT No.: PCT/JP2020/009073
§ 371 (c)(1),
(2) Date: Jul. 1, 2022

(87) PCT Pub. No.: WO2021/176583
PCT Pub. Date: Sep. 10, 2021

(65) Prior Publication Data
US 2023/0053065 A1    Feb. 16, 2023

(51) Int. Cl.
*G01N 21/63* (2006.01)
*G01N 21/35* (2014.01)
*G01N 21/41* (2006.01)

(52) U.S. Cl.
CPC ............. *G01N 21/63* (2013.01); *G01N 21/35* (2013.01); *G01N 21/41* (2013.01)

(58) Field of Classification Search
CPC ........ G01N 21/63; G01N 21/35; G01N 21/41; G01N 2021/4153; G01N 21/4133; G01N 21/171; G01N 2021/1725; G01N 2021/1731
See application file for complete search history.

(56) References Cited

U.S. PATENT DOCUMENTS

2017/0146455 A1* 5/2017 Mantele ............... A61B 5/1455
2021/0059574 A1* 3/2021 Shinohara ............. G01N 21/41

FOREIGN PATENT DOCUMENTS

JP    2017-519214 A    7/2017
JP    6425861 B1    11/2018

OTHER PUBLICATIONS

International Search Report and Written Opinion mailed on Jul. 14, 2020, received for PCT Application PCT/JP2020/009073, filed on Mar. 4, 2020, 9 pages including English Translation.

* cited by examiner

*Primary Examiner* — David P Porta
*Assistant Examiner* — Mamadou Faye
(74) *Attorney, Agent, or Firm* — XSENSUS LLP

(57) ABSTRACT

A biological component measurement apparatus includes an optical medium, a high thermal conductive film, an excitation light source, a probe light source, and a light position detector. The high thermal conductive film is higher in thermal conductivity than the optical medium, and is provided on a sample placement surface of the optical medium. The high thermal conductive film spreads heat generated from the sample irradiated with excitation light more in a first direction than in a second direction. The first direction is a traveling direction of probe light in plan view of the sample placement surface. The second direction is a direction orthogonal to the first direction in plan view of the sample placement surface.

18 Claims, 9 Drawing Sheets

BIOLOGICAL COMPONENT MEASUREMENT APPARATUS

CROSS-REFERENCE TO RELATED APPLICATION

The present application is based on PCT filing PCT/JP2020/009073, filed Mar. 4, 2020, the entire contents of which are incorporated herein by reference.

TECHNICAL FIELD

The present disclosure relates to a biological component measurement apparatus.

BACKGROUND ART

National Patent Publication No. 2017-519214 (PTL 1) discloses a noninvasive analysis system including an optical medium, an infrared light source, a probe light source, and a photodiode. Specifically, a biological sample is placed on a surface of the optical medium. The infrared light source emits infrared light. The infrared light travels through the optical medium to illuminate the biological sample. The infrared light is absorbed by the biological sample to cause the biological sample to generate heat. The amount of absorption heat of the biological sample varies in a manner that depends on the amount or concentration of a biological component present in the sample or on the surface of the sample.

The probe light source emits, toward the optical medium, probe light that is visible light. The probe light is totally internally reflected at an interface between the optical medium and the biological sample to outgo from the optical medium. The absorption heat of the biological sample transfers to the optical medium to change a refractive index of the optical medium. The change in refractive index of the optical medium affects total internal reflection of the probe light at the interface between the optical medium and the biological sample to change a traveling direction of the probe light that outgoes from the optical medium. The photodiode detects a change in the traveling direction of the probe light. The amount or concentration of a biological component is measured based on the change in the traveling direction of the probe light detected by the photodiode. For example, when the sample is a skin of a patient, a blood glucose level of the patient is measured as a biological component.

CITATION LIST

Patent Literature

PTL 1: National Patent Publication No. 2017-519214

SUMMARY OF INVENTION

Technical Problem

In the noninvasive analysis system disclosed in PTL 1, however, the optical medium is formed from zinc sulfide (ZnS). Zinc sulfide (ZnS) has a high thermal conductivity of 27.2 W/(m·K). The absorption heat of the biological sample transfers to the optical medium and rapidly and isotropically spreads into the optical medium. A large amount of heat spreads to a region other than an optical path of the probe light in the optical medium. This restrains an increase in temperature of a part of the optical medium located on the optical path of the probe light. This makes a change in refractive index of the part of the optical medium located on the optical path of the probe light smaller. This in turn prevents the biological component from being measured with high accuracy. The present disclosure has been made in view of the above-described problems, and it is therefore an object of the present disclosure to provide a biological component measurement apparatus capable of measuring a biological component with improved accuracy.

Solution to Problem

A biological component measurement apparatus according to the present disclosure includes an optical medium, a high thermal conductive film, an excitation light source, a probe light source, and a light position detector. The optical medium includes a sample placement surface. The high thermal conductive film is higher in thermal conductivity than the optical medium, and is provided on the sample placement surface. The excitation light source emits, toward a sample placed on the high thermal conductive film, excitation light that travels through the optical medium. The probe light source emits probe light that travels through the optical medium. The light position detector detects a position of the probe light outgoing from the optical medium. In plan view of the sample placement surface, an optical path of the probe light in the optical medium overlaps an irradiation part of the sample placement surface irradiated with the excitation light. The high thermal conductive film spreads heat generated from the sample irradiated with the excitation light more in a first direction than in a second direction. The first direction is a traveling direction of the probe light in plan view of the sample placement surface. The second direction is a direction orthogonal to the first direction in plan view of the sample placement surface.

Advantageous Effects of Invention

The high thermal conductive film concentrates a temperature gradient region of the optical medium caused by the heat generated from the sample irradiated with the excitation light into a part of the optical medium located around the optical path of probe light. A change in temperature of the part of the optical medium located around the optical path of the probe light becomes larger, and the temperature gradient region of the optical medium through which the probe light propagates becomes longer. A change in refractive index of the part of the optical medium located around the optical path of the probe light becomes larger, and a refractive index gradient region of the optical medium through which the probe light propagates becomes longer. A displacement amount of the probe light detected by the light position detector becomes larger. This enables the biological component measurement apparatus according to the present disclosure to measure the biological component with improved accuracy.

DESCRIPTION OF EMBODIMENTS

Figure 1:
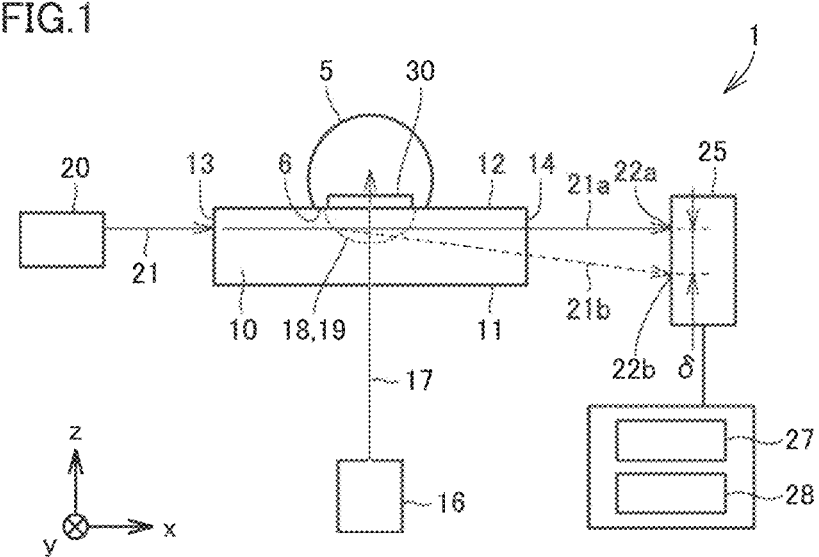
FIG. 1 is a diagram schematically illustrating a biological component measurement apparatus according to a first embodiment.

Hereinafter, embodiments will be described. Note that the same components are denoted by the same reference numerals to avoid the description from being redundant.

First Embodiment

Figure 2:
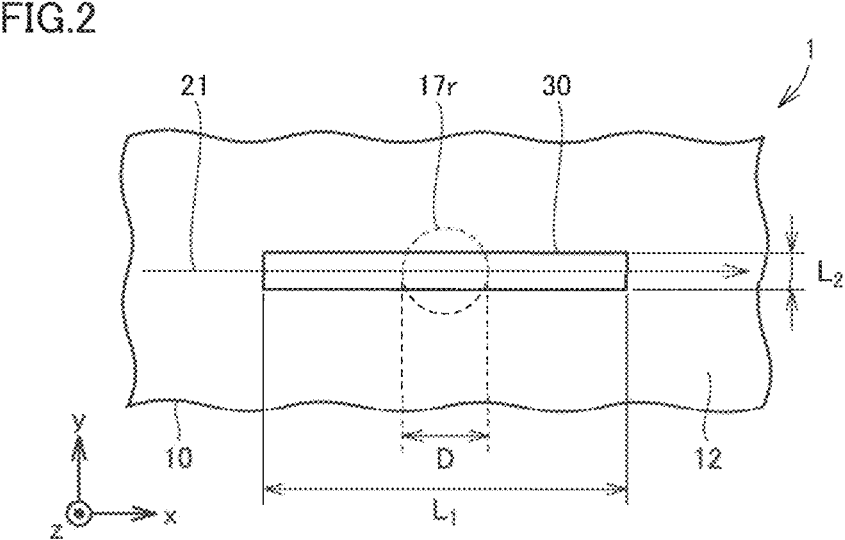
FIG. 2 is a partially enlarged plan view schematically illustrating the biological component measurement apparatus according to the first embodiment.

With reference to FIGS. 1 and 2, a biological component measurement apparatus 1 according to a first embodiment will be described. Biological component measurement apparatus 1 mainly includes an optical medium 10, a high thermal conductive film 30, an excitation light source 16, a probe light source 20, a light position detector 25, a displacement amount calculation unit 27, and a biological component measurement unit 28.

Optical medium 10 includes a first surface 11, a second surface 12 located on the opposite side of optical medium 10 from first surface 11, a third surface 13 connecting first surface 11 and second surface 12, and a fourth surface 14 connecting first surface 11 and second surface 12 and located on the opposite side of optical medium 10 from third surface 13. First surface 11 of optical medium 10 is a surface on which excitation light 17 emitted from excitation light source 16 impinges. Second surface 12 is a sample placement surface. A sample 5 is placed on second surface 12. Sample 5 is, for example, a skin or a body fluid of a patient. When a liquid is to be measured, sample 5 is a liquid contained in a transparent sample holder (not illustrated). Third surface 13 is a surface on which probe light 21 emitted from probe light source 20 impinges. Fourth surface 14 is a surface from which probe light 21 outgoes.

Optical medium 10 is transparent to excitation light 17. Herein, the fact that optical medium 10 is transparent to excitation light 17 means that light transmittance of optical medium 10 with respect to excitation light 17 is greater than or equal to 25%. The light transmittance of optical medium 10 with respect to excitation light 17 may be greater than or equal to 50%, may be greater than or equal to 75%, or may be greater than or equal to 90%. Optical medium 10 is transparent to probe light 21. Herein, the fact that optical medium 10 is transparent to probe light 21 means that light transmittance of optical medium 10 with respect to probe light 21 is greater than or equal to 25%. The light transmittance of optical medium 10 with respect to probe light 21 may be greater than or equal to 50%, may be greater than or equal to 75%, or may be greater than or equal to 90%. Optical medium 10 is formed of, for example, zinc selenide (ZnSe, having a thermal conductivity of 27 W/(m·K)) or zinc sulfide (ZnS, having a thermal conductivity of 18 W/(m·K)). Optical medium 10 may be formed of an infrared transmission material such as chalcogenide glass.

Excitation light source 16 emits, toward sample 5 placed on the sample placement surface (second surface 12) and high thermal conductive film 30, excitation light 17 that travels through optical medium 10. Excitation light 17 is emitted from excitation light source 16 to impinge on optical medium 10 through first surface 11. Excitation light 17 travels through optical medium 10. Excitation light 17 impinges on sample 5 through second surface 12. Excitation light 17 is absorbed by a biological component present in sample 5 or on a surface 6 of sample 5. For example, when the blood glucose level of the patient is measured using biological component measurement apparatus 1, the biological component is glucose present in interstitial fluid in epidermis. Excitation light 17 is absorbed by the biological component to generate absorption heat in sample 5. The absorption heat of sample 5 transfers to optical medium 10. A temperature gradient region 19 is generated in optical medium 10, and a refractive index gradient region 18 is generated in optical medium 10 accordingly.

A wavelength of excitation light 17 is determined in accordance with an absorption wavelength of the biological component present in sample 5 or on surface 6 of sample 5. The wavelength of excitation light 17 may be longer than a wavelength of probe light 21. Excitation light 17 is, for example, infrared light having a wavelength greater than or equal to 3 μm and less than or equal to 20 μm. Excitation light 17 may be light having a plurality of wavelengths. For example, when the blood glucose level of the patient is measured using biological component measurement apparatus 1, the wavelength of excitation light 17 falls within a wavelength range including a wavelength of a fingerprint spectrum of glucose (for example, a wavelength range of greater than or equal to 8.5 μm to less than or equal to 10

μm). Excitation light source 16 is, for example, a quantum cascade laser capable of emitting broadband infrared light. Sample 5 may be irradiated with reference light that is not absorbed by the biological component present in sample 5 or on surface 6 of sample 5, together with excitation light 17.

Probe light source 20 emits probe light 21. Probe light 21 has, for example, a wavelength within a wavelength region from the visible region to the near-infrared region. Probe light source 20 is, for example, a semiconductor laser. Probe light 21 travels in a first direction (x direction) in plan view of the sample placement surface (second surface 12). In plan view of the sample placement surface (second surface 12), an optical path of probe light 21 in optical medium 10 overlaps an irradiation part 17r of the sample placement surface (second surface 12) irradiated with excitation light 17.

Specifically, probe light 21 impinges on optical medium 10 through third surface 13 of optical medium 10. Probe light 21 travels through optical medium 10 along second surface 12 of optical medium 10. While probe light 21 is traveling through optical medium 10, probe light 21 travels through refractive index gradient region 18 generated in optical medium 10 by the absorption heat of sample 5. Probe light 21 is refracted by refractive index gradient region 18, and a traveling direction of probe light 21 changes accordingly. Probe light 21 (first outgoing probe light 21a and second outgoing probe light 21b) outgoes from fourth surface 14 of optical medium 10.

Light position detector 25 detects a position of probe light 21 (first outgoing probe light 21a and second outgoing probe light 21b) outgoing from optical medium 10. Light position detector 25 detects a first position 22a of probe light 21 (first outgoing probe light 21a) when sample 5 is not irradiated with excitation light 17. Light position detector 25 detects a second position 22b of probe light 21 (second outgoing probe light 21b) when sample 5 is irradiated with excitation light 17. Irradiating sample 5 with excitation light 17 causes the position of probe light 21 detected by light position detector 25 to be displaced from first position 22a to second position 22b.

Light position detector 25 outputs first position 22a of probe light 21 (first outgoing probe light 21a) and second position 22b of probe light 21 (second outgoing probe light 21b) to displacement amount calculation unit 27. Light position detector 25 is, for example, a photodiode or a semiconductor position detection element.

Displacement amount calculation unit 27 is connected to light position detector 25. Displacement amount calculation unit 27 calculates a displacement amount δ of probe light 21 corresponding to a distance between first position 22a and second position 22b. Biological component measurement unit 28 measures the biological component in sample 5 or on surface 6 of sample 5 based on displacement amount δ of probe light 21. Displacement amount calculation unit 27 and biological component measurement unit 28 may be implemented by, for example, a processing device.

High thermal conductive film 30 is provided on the sample placement surface (second surface 12). Sample 5 is placed on high thermal conductive film 30. High thermal conductive film 30 is higher in thermal conductivity than optical medium 10. The thermal conductivity of high thermal conductive film 30 may be, for example, greater than or equal to 1.5 times the thermal conductivity of optical medium 10. The thermal conductivity of high thermal conductive film 30 may be, for example, greater than or equal to 2.0 times the thermal conductivity of optical medium 10. High thermal conductive film 30 is formed of, for example, silicon (Si, having a thermal conductivity of 160 W/(m·K)) or germanium (Ge, having a thermal conductivity of 59 W/(m·K)).

In plan view of the sample placement surface (second surface 12), high thermal conductive film 30 overlaps irradiation part 17r of the sample placement surface (second surface 12) irradiated with excitation light 17. High thermal conductive film 30 is transparent to excitation light 17. Herein, the fact that high thermal conductive film 30 is transparent to excitation light 17 means that light transmittance of high thermal conductive film 30 with respect to excitation light 17 is greater than or equal to 25%. The light transmittance of high thermal conductive film 30 with respect to excitation light 17 may be greater than or equal to 50%, may be greater than or equal to 75%, or may be greater than or equal to 90%.

High thermal conductive film 30 may be transparent to probe light 21. Herein, the fact that high thermal conductive film 30 is transparent to probe light 21 means that light transmittance of high thermal conductive film 30 with respect to probe light 21 is greater than or equal to 25%. The light transmittance of high thermal conductive film 30 with respect to probe light 21 may be greater than or equal to 50%, may be greater than or equal to 75%, or may be greater than or equal to 90%.

High thermal conductive film 30 spreads heat generated from sample 5 irradiated with excitation light 17 more in the first direction (x direction) than in a second direction (y direction). The second direction (y direction) is a direction orthogonal to the first direction (x direction) in plan view of the sample placement surface (second surface 12). In plan view of the sample placement surface (second surface 12), high thermal conductive film 30 overlaps probe light 21 in the first direction (x direction).

In plan view of the sample placement surface (second surface 12), high thermal conductive film 30 has a strip shape with long sides extending in the first direction (x direction) and short sides extending in the second direction (y direction). A first length $L_1$ of high thermal conductive film 30 in the first direction (x direction) is greater than a second length $L_2$ of high thermal conductive film 30 in the second direction (y direction). First length $L_1$ is, for example, greater than or equal to twice second length $L_2$. First length $L_1$ may be greater than or equal to three times second length $L_2$, may be greater than or equal to four times second length $L_2$, may be greater than or equal to five times second length $L_2$, may be greater than or equal to six times second length $L_2$, may be greater than or equal to eight times second length $L_2$, or may be greater than or equal to ten times second length $L_2$. A thickness of high thermal conductive film 30 may be greater than or equal to 1 μm, or may be greater than or equal to 10 μm.

In plan view of the sample placement surface (second surface 12), high thermal conductive film 30 extends across irradiation part 17r in the first direction (x direction). First length $L_1$ of high thermal conductive film 30 in the first direction (x direction) is greater than a diameter D of irradiation part 17r. Second length $L_2$ of high thermal conductive film 30 in the second direction (y direction) may be less than diameter D of the irradiation part 17r. Second length $L_2$ of high thermal conductive film 30 in the second direction (y direction) may be greater than a width of probe light 21, which is a length of probe light 21 in the second direction (y direction). In plan view of the sample placement surface (second surface 12), high thermal conductive film 30 may be provided symmetrically with respect to irradiation part 17r or the optical axis of excitation light 17 in the first direction (x direction) and the second direction (y direction).

Figure 3:
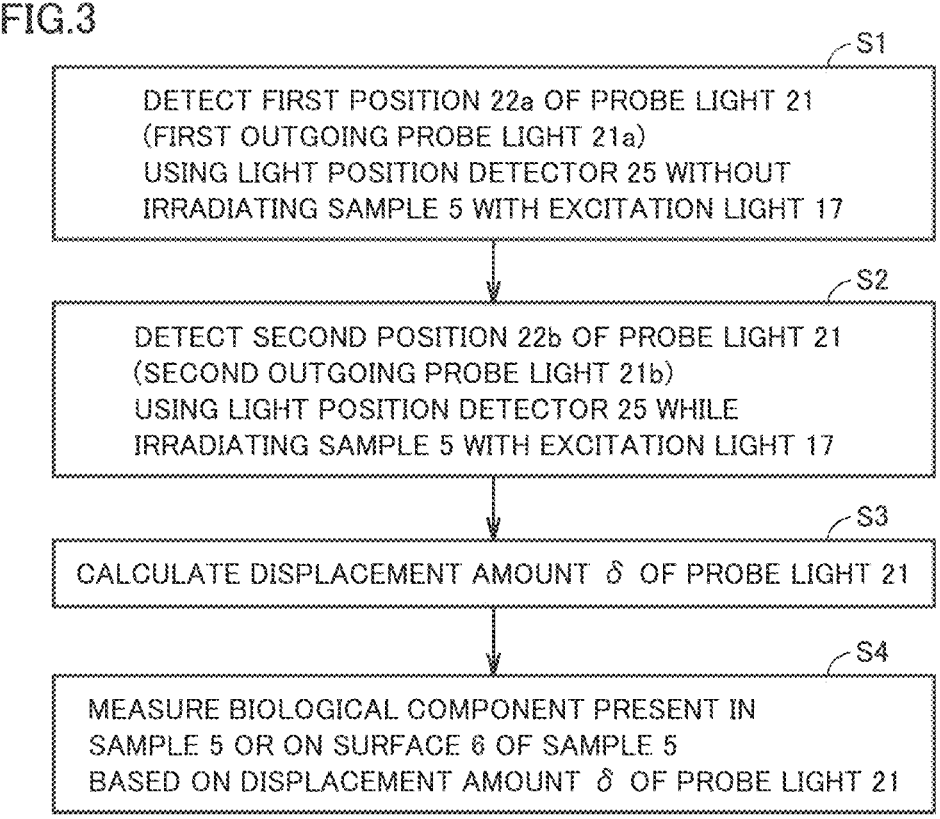
FIG. 3 is a flowchart of a biological component measurement method according to the first embodiment.

With reference to FIG. 3, a biological component measurement method according to the present embodiment using biological component measurement apparatus 1 will be described.

The biological component measurement method according to the present embodiment includes detecting first position 22a of probe light 21 (first outgoing probe light 21a) using light position detector 25 without irradiating sample 5 with excitation light 17 (S1). Since sample 5 is not irradiated with excitation light 17, no absorption heat is generated in sample 5. No temperature gradient region 19 is generated in optical medium 10, and no refractive index gradient region 18 is generated in optical medium 10 accordingly. When sample 5 is not irradiated with excitation light 17, probe light 21 (first outgoing probe light 21a) outgoes from optical medium 10. First position 22a of probe light 21 (first outgoing probe light 21a) is a position of probe light 21 (first outgoing probe light 21a) detected by light position detector 25 when sample 5 is not irradiated with excitation light 17.

The biological component measurement method according to the present embodiment includes detecting second position 22b of probe light 21 (second outgoing probe light 21b) using light position detector 25 while irradiating sample 5 with excitation light 17 (S2). Since sample 5 is irradiated with excitation light 17, excitation light 17 is absorbed by the biological component present in sample 5 or on surface 6 of sample 5. Excitation light 17 is absorbed by the biological component to generate absorption heat in sample 5. High thermal conductive film 30 spreads the absorption heat of sample 5 more in the first direction (x direction) than in the second direction (y direction). The absorption heat of sample 5 transfers to optical medium 10 through high thermal conductive film 30. Temperature gradient region 19 is generated in optical medium 10, and refractive index gradient region 18 is generated in optical medium 10 accordingly.

Probe light 21 is refracted by refractive index gradient region 18, and the traveling direction of probe light 21 changes accordingly. When sample 5 is irradiated with excitation light 17, probe light 21 (second outgoing probe light 21b) outgoes from optical medium 10. Second position 22b of probe light 21 (second outgoing probe light 21b) is a position of probe light 21 (second outgoing probe light 21b) detected by light position detector 25 when sample 5 is irradiated with excitation light 17. Irradiating sample 5 with excitation light 17 causes the position of probe light 21 detected by light position detector 25 to be displaced from first position 22a to second position 22b.

The biological component measurement method according to the present embodiment includes calculating displacement amount δ of probe light 21 (S3). Specifically, displacement amount calculation unit 27 calculates displacement amount δ of probe light 21 corresponding to a distance between first position 22a and second position 22b.

The biological component measurement method according to the present embodiment includes measuring the biological component present in sample 5 or on surface 6 of sample 5 based on displacement amount δ of probe light 21 (S4). For example, biological component measurement unit 28 is connected to a memory (not illustrated). The memory stores a data table where the type of the biological component, displacement amount δ of probe light 21, and the amount or concentration of the biological component are associated with each other. Biological component measurement unit 28 consults the data table to obtain, for example, the amount or concentration of the biological component in sample 5 or on surface 6 of sample 5 based on the type of the biological component and displacement amount δ of probe light 21.

Actions of biological component measurement apparatus 1 according to the present embodiment will be described with reference to biological component measurement apparatuses 1 according to first to third examples of the present embodiment and a biological component measurement apparatus according to a comparative example. As shown in Table 1, the first to third examples are different from each other in the shape (first length $L_1$) of high thermal conductive film 30. In the first to third examples, the thickness of high thermal conductive film 30 is 10 μm. As shown in Table 1, the comparative example is different from the present embodiment in that high thermal conductive film 30 is not provided on the sample placement surface (second surface 12) of optical medium 10.

TABLE 1

|  | First length $L_1$ (μm) of high thermal conductive film 30 | Second length $L_2$ (μm) of high thermal conductive film 30 | Displacement amount δ of probe light 21 |
|---|---|---|---|
| Comparative example | Null | Null | 1 |
| First example | 200 | 20 | 1.21 |
| Second example | 120 | 20 | 1.17 |
| Third example | 40 | 20 | 1.01 |

Table 1 shows displacement amounts δ of probe light 21 according to the first to third examples that are normalized according to displacement amount δ of probe light 21 according to the comparative example. In the first to third examples and comparative example, diameter D of excitation light 17 is 40 μm, and the width of probe light 21 is 20 μm.

Figure 5:
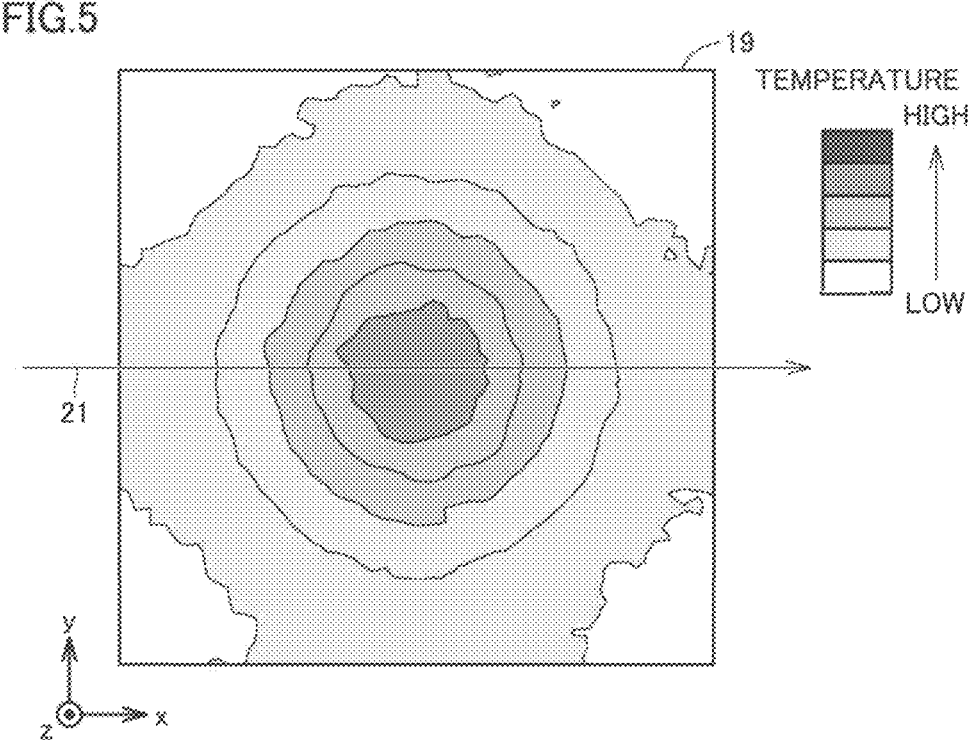
FIG. 5 is a diagram illustrating a result of simulation of temperature distribution in the temperature gradient region of the optical medium in a biological component measurement apparatus according to a comparative example.

In the comparative example, high thermal conductive film 30 is not provided on the sample placement surface (second surface 12) of optical medium 10. This causes, in plan view of the sample placement surface (second surface 12), the absorption heat of sample 5 to isotropically spread. As illustrated in FIG. 5, in the comparative example, temperature gradient region 19 isotropically extends in plan view of the sample placement surface (second surface 12).

Figure 4:
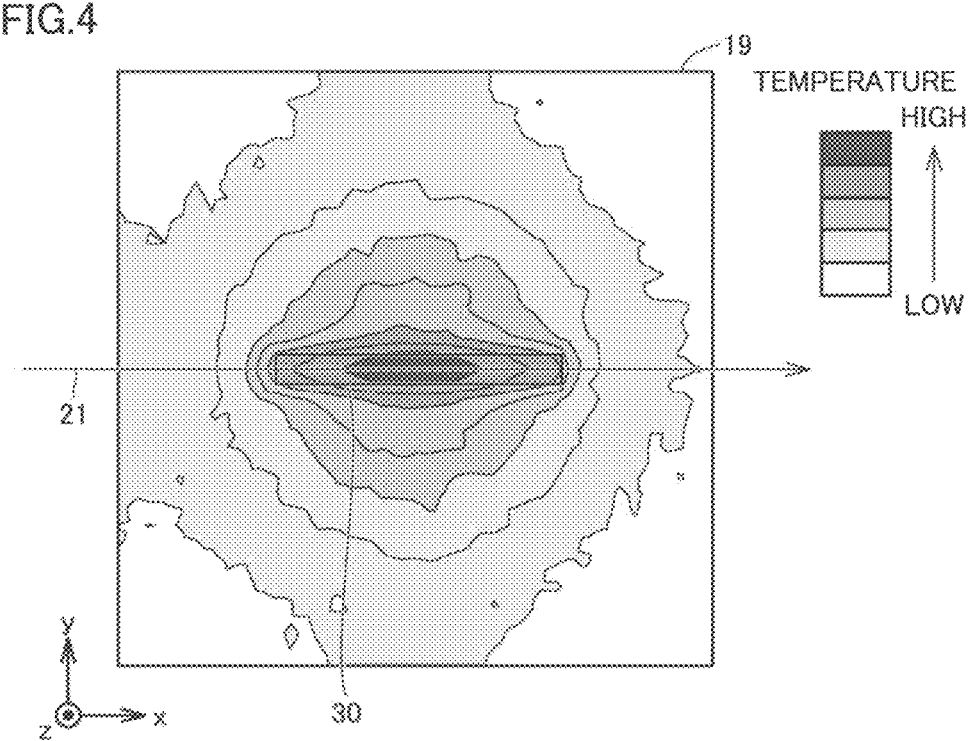
FIG. 4 is a diagram illustrating a result of simulation of a temperature gradient region of an optical medium in the biological component measurement apparatus according to a first example of the first embodiment.

On the other hand, in the first to third examples, high thermal conductive film 30 spreads heat generated from sample 5 irradiated with excitation light 17 more in the first direction (x direction) than in the second direction (y direction). The heat generated from sample 5 transfers through optical medium 10 along the shape of high thermal conductive film 30. High thermal conductive film 30 concentrates temperature gradient region 19 of optical medium 10 caused by the heat generated from sample 5 irradiated with excitation light 17 into a part of optical medium 10 located around the optical path of probe light 21. In the first to third examples, as compared with the comparative example, a change in temperature of the part (temperature gradient region 19) of optical medium 10 located around the optical path of probe light 21 becomes large, and temperature gradient region 19 of optical medium 10 through which probe light 21 propagates becomes long (see, for example, temperature gradient region 19 in the first example illustrated in FIG. 4). In the first to third examples, as compared with the comparative example, a change in refractive index of the part (refractive index gradient region 18) of optical medium 10 located around the optical path of probe light 21 becomes large, and refractive index gradient region 18 of optical medium 10 through which probe light 21 propagates becomes long. Therefore, in the first to third examples, the biological component can be measured with improved accuracy as compared with the comparative example.

Figure 6:
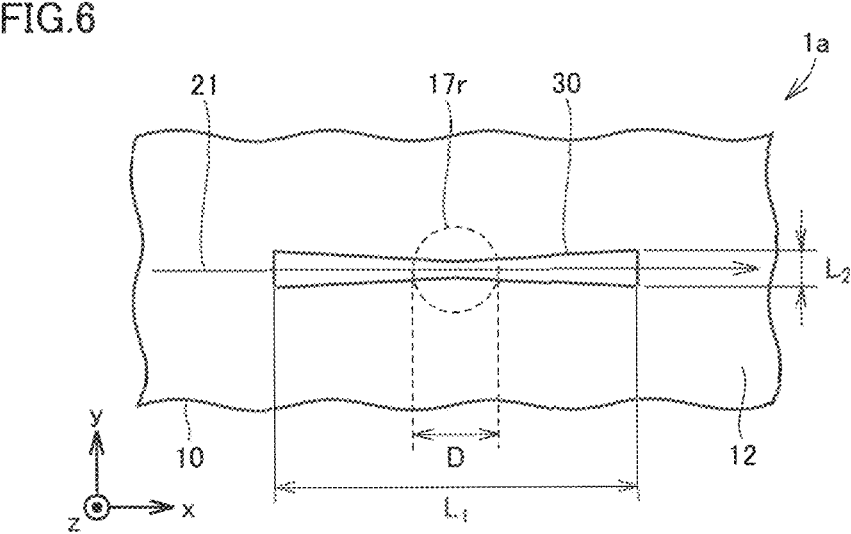
FIG. 6 is a partially enlarged plan view schematically illustrating a biological component measurement apparatus according to a modification of the first embodiment.

With reference to FIG. 6, a biological component measurement apparatus 1a according to a modification of the first embodiment will be described. In biological component measurement apparatus 1a, second length $L_2$ of high thermal conductive film 30 in the second direction (y direction) decreases toward irradiation part 17r. This causes more excitation light 17 to be applied to sample 5, and the absorption heat of sample 5 increases accordingly. Further, high thermal conductive film 30 suppresses diffusion, in the second direction (y direction), of the heat generated from sample 5 irradiated with excitation light 17. High thermal conductive film 30 spreads the heat generated from sample 5 irradiated with excitation light 17 more in the first direction (x direction) than in the second direction (y direction). The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. This allows the biological component to be measured with improved accuracy.

Effects of biological component measurement apparatuses 1, 1a according to the present embodiment will be described.

Biological component measurement apparatuses 1, 1a according to the present embodiment each include optical medium 10, high thermal conductive film 30, excitation light source 16, probe light source 20, and light position detector 25. Optical medium 10 includes the sample placement surface (second surface 12). High thermal conductive film 30 is higher in thermal conductivity than optical medium 10, and is provided on the sample placement surface (second surface 12). Excitation light source 16 emits, toward sample 5 placed on the sample placement surface (second surface 12) and high thermal conductive film 30, excitation light 17 that travels through optical medium 10. Probe light source 20 emits probe light 21 that travels through optical medium 10. Light position detector 25 detects the position of probe light 21 outgoing from optical medium 10. In plan view of the sample placement surface (second surface 12), an optical path of probe light 21 in optical medium 10 overlaps irradiation part 17r of the sample placement surface (second surface 12) irradiated with excitation light 17. High thermal conductive film 30 spreads heat generated from sample 5 irradiated with excitation light 17 more in the first direction (x direction) thus in the second direction (y direction). The first direction (x direction) is a traveling direction of probe light 21 in plan view of the sample placement surface (second surface 12). The second direction (y direction) is a direction orthogonal to the first direction (x direction) in plan view of the sample placement surface (second surface 12).

In biological component measurement apparatuses 1, 1a, high thermal conductive film 30 concentrates temperature gradient region 19 of optical medium 10 caused by the heat generated from sample 5 irradiated with excitation light 17 into the part of optical medium 10 located around the optical path of probe light 21. The change in temperature of the part (temperature gradient region 19) of optical medium 10 located around the optical path of probe light 21 becomes larger, and temperature gradient region 19 of optical medium 10 through which probe light 21 propagates becomes longer. The change in refractive index of the part (refractive index gradient region 18) of optical medium 10 located around the optical path of probe light 21 becomes larger, and refractive index gradient region 18 of optical medium 10 through which probe light 21 propagates becomes longer. Displacement amount δ of probe light 21 detected by light position detector 25 becomes larger. This enables biological component measurement apparatuses 1, 1a to measure the biological component with improved accuracy.

In biological component measurement apparatuses 1, 1a according to the present embodiment, high thermal conductive film 30 overlaps probe light 21 in the first direction (x direction) in plan view of the sample placement surface (second surface 12). Accordingly, the change in temperature of the part (temperature gradient region 19) of optical medium 10 located around the optical path of probe light 21 becomes larger, and temperature gradient region 19 of optical medium 10 through which probe light 21 propagates becomes longer. The change in refractive index of the part (refractive index gradient region 18) of optical medium 10 located around the optical path of probe light 21 becomes larger, and refractive index gradient region 18 of optical medium 10 through which probe light 21 propagates becomes longer. Displacement amount δ of probe light 21 detected by light position detector 25 becomes larger. This enables biological component measurement apparatuses 1, 1a to measure the biological component with improved accuracy.

In biological component measurement apparatuses 1, 1a according to the present embodiment, second length $L_2$ of high thermal conductive film 30 in the second direction (y direction) may be greater than the width of probe light 21, which is the length of probe light 21 in the second direction (y direction). Accordingly, a temperature distribution in the part (temperature gradient region 19) of optical medium 10 located around the optical path of probe light 21 becomes more uniform over the width of probe light 21. A refractive index distribution in the part (refractive index gradient region 18) of optical medium 10 located around the optical path of probe light 21 becomes more uniform over the width of probe light 21. The disturbance of the propagation of probe light 21 through optical medium 10 is reduced. This enables biological component measurement apparatuses 1, 1a to measure the biological component with improved accuracy.

In biological component measurement apparatuses 1, 1a according to the present embodiment, high thermal conductive film 30 has a strip shape with long sides extending in the first direction (x direction) and short sides extending in the second direction (y direction) in plan view of the sample placement surface (second surface 12). This causes high thermal conductive film 30 to spread heat generated from sample 5 irradiated with excitation light 17 more in the first direction (x direction) in the second direction (y direction). The change in temperature of the part (temperature gradient region 19) of optical medium 10 located around the optical path of probe light 21 becomes larger, and temperature gradient region 19 of optical medium 10 through which probe light 21 propagates becomes longer. The change in refractive index of the part (refractive index gradient region 18) of optical medium 10 located around the optical path of probe light 21 becomes larger, and refractive index gradient region 18 of optical medium 10 through which probe light 21 propagates becomes longer. Displacement amount δ of probe light 21 detected by light position detector 25 becomes larger. This enables biological component measurement apparatuses 1, 1a to measure the biological component with improved accuracy.

In biological component measurement apparatuses 1, 1a according to the present embodiment, high thermal conductive film 30 extends across irradiation part 17r in the first direction (x direction) in plan view of the sample placement surface (second surface 12). This allows high thermal conductive film 30 to be disposed near sample 5 that is a heat generation source. The change in temperature of the part (temperature gradient region 19) of optical medium 10 located around the optical path of probe light 21 becomes larger, and temperature gradient region 19 of optical medium 10 through which probe light 21 propagates becomes longer. The change in refractive index of the part (refractive index gradient region 18) of optical medium 10 located around the optical path of probe light 21 becomes larger, and refractive index gradient region 18 of optical medium 10 through which probe light 21 propagates becomes longer. Displacement amount δ of probe light 21 detected by light position detector 25 becomes larger. This enables biological component measurement apparatuses 1, 1a to measure the biological component with improved accuracy.

In biological component measurement apparatus 1a according to the present embodiment, second length of high thermal conductive film 30 in the second direction (y direction) decreases toward irradiation part 17r. This causes more excitation light 17 to be applied to sample 5, and the absorption heat of sample 5 increases accordingly. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1a to measure the biological component with improved accuracy.

In biological component measurement apparatuses 1, 1a according to the present embodiment, high thermal conductive film 30 is formed of silicon or germanium. This makes high thermal conductive film 30 transparent to excitation light 17. More excitation light 17 is applied to sample 5, and the absorption heat of sample 5 increases accordingly. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatuses 1, 1a to measure the biological component with improved accuracy.

Second Embodiment

Figure 7:
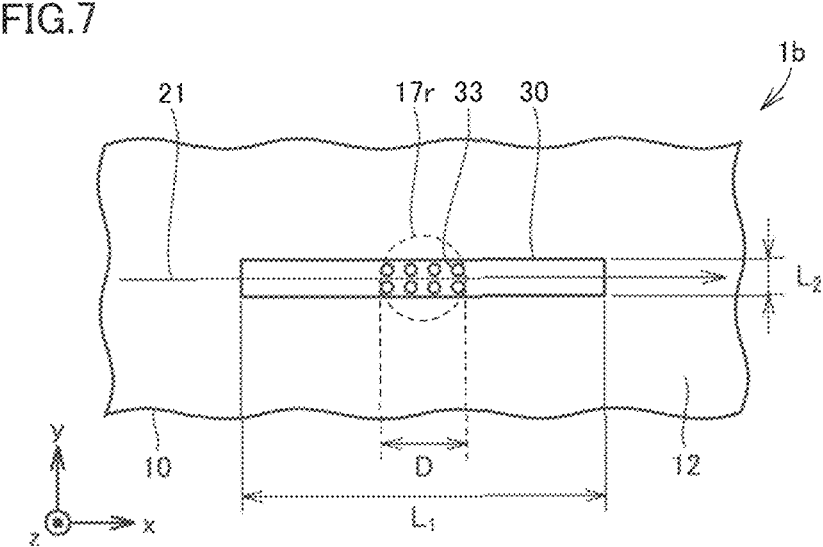
FIG. 7 is a partially enlarged plan view schematically illustrating a biological component measurement apparatus according to a second embodiment.

With reference to FIG. 7, a biological component measurement apparatus 1b according to the second embodiment will be described. Biological component measurement apparatus 1b according to the present embodiment is similar in configuration to biological component measurement apparatus 1 according to the first embodiment, but is different mainly in the following points.

In biological component measurement apparatus 1b, at least one opening 33 is provided in a part of high thermal conductive film 30 that overlaps irradiation part 17r. A plurality of openings 33 may be provided in the part of high thermal conductive film 30 that overlaps irradiation part 17r. A diameter of opening 33 (or each of the plurality of openings 33) is less than a diameter of excitation light 17 and less than diameter D of irradiation part 17r. In plan view of the sample placement surface (second surface 12), a total area of opening 33 may be greater than or equal to 50% of an area of the part of high thermal conductive film 30 that overlaps irradiation part 17r, or may be greater than or equal to 80% of the area of the part of high thermal conductive film 30 that overlaps irradiation part 17r.

Since high thermal conductive film 30 is not present in a part of irradiation part 17r, more excitation light 17 can be applied to sample 5. Therefore, as the material of high thermal conductive film 30 according to the present embodiment, a material that is lower in transmittance to excitation light 17 but higher in thermal conductivity than the material of high thermal conductive film 30 according to the first embodiment may be used. The material of high thermal conductive film 30 according to the present embodiment is, for example, metal such as gold (Au, having a thermal conductivity of 295 W/(m·K)) or copper (Cu, having a thermal conductivity of 386 W/(m·K)).

Biological component measurement apparatus 1b according to the present embodiment produces the following effects in addition to the effects produced by biological component measurement apparatus 1 according to the first embodiment.

In biological component measurement apparatus 1b according to the present embodiment, at least one opening 33 is provided in the part of high thermal conductive film 30 that overlaps irradiation part 17r.

This causes more excitation light 17 to be applied to sample 5, and the absorption heat of sample 5 increases accordingly. Furthermore, as the material of high thermal conductive film 30, a material lower in transmittance to excitation light 17 but higher in thermal conductivity may be used. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1b to measure the biological component with improved accuracy.

Third Embodiment

Figure 8:
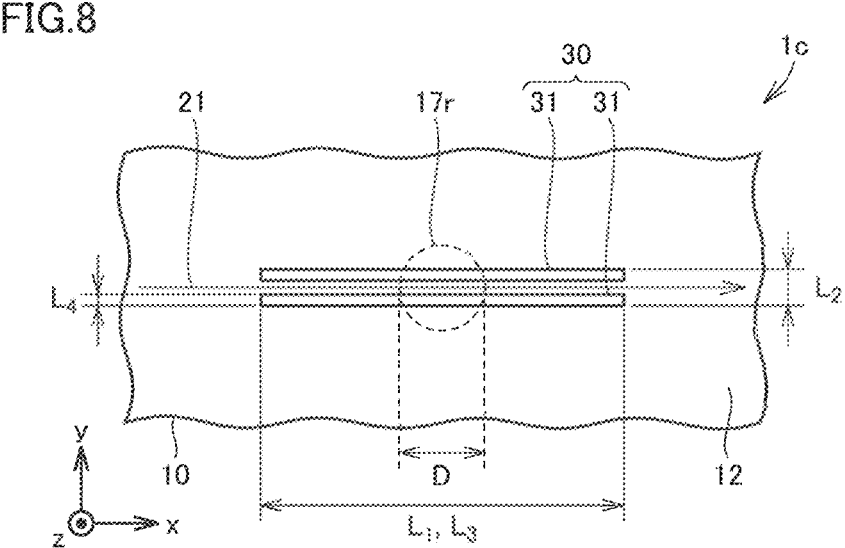
FIG. 8 is a partially enlarged plan view schematically illustrating a biological component measurement apparatus according to a third embodiment.

With reference to FIG. 8, a biological component measurement apparatus 1c according to a third embodiment will be described. Biological component measurement apparatus 1c according to the present embodiment is similar in configuration to biological component measurement apparatus 1 according to the first embodiment, but is different mainly in the following points.

In biological component measurement apparatus 1c, high thermal conductive film 30 includes a plurality of high thermal conductive film parts 31. The plurality of high thermal conductive film parts 31 are arranged in the second direction (y direction) with a gap provided between high thermal conductive film parts 31. In plan view of the sample placement surface (second surface 12), the plurality of high thermal conductive film parts 31 may be provided symmetrically with respect to irradiation part 17r or the optical axis of excitation light 17 in the first direction (x direction) and the second direction (y direction).

The plurality of high thermal conductive film parts 31 each have a strip shape with long sides extending in the first direction (x direction) and short sides extending in the second direction (y direction). A third length $L_3$ of each of the plurality of high thermal conductive film parts 31 in the first direction (x direction) (first length $L_1$ of high thermal conductive film 30) is greater than a fourth length $L_4$ of each of the plurality of high thermal conductive film parts 31 in the second direction (y direction). Third length $L_3$ is, for example, greater than or equal to twice fourth length $L_4$. Third length $L_3$ may be greater than or equal to three times fourth length $L_4$, may be greater than or equal to four times fourth length $L_4$, may be greater than or equal to five times fourth length $L_4$, may be greater than or equal to six times fourth length $L_4$, may be greater than or equal to eight times fourth length $L_4$, or may be greater than or equal to ten times fourth length $L_4$.

In plan view of the sample placement surface (second surface 12), the plurality of high thermal conductive film parts 31 each overlap irradiation part 17r of the sample placement surface (second surface 12) irradiated with excitation light 17. The plurality of high thermal conductive film parts 31 each spread heat generated from sample 5 irradiated with excitation light 17 more in the first direction (x direction) than in the second direction (y direction). In plan view of the sample placement surface (second surface 12), each of the plurality of high thermal conductive film parts 31 may overlap probe light 21 or may be separated from probe light 21.

In plan view of the sample placement surface (second surface 12), the plurality of high thermal conductive film parts 31 each extend across irradiation part 17r in the first direction (x direction). Third length $L_3$ of each of the plurality of high thermal conductive film parts 31 in the first direction (x direction) is greater than diameter D of irradiation part 17r. Fourth length $L_4$ of each of the plurality of high thermal conductive film parts 31 in the second direction (y direction) is less than diameter D of irradiation part 17r. The gap between the pair of high thermal conductive film parts 31 adjacent to each other is less than diameter D of irradiation part 17r.

Biological component measurement apparatus 1c according to the present embodiment produces the following effects in addition to the effects produced by biological component measurement apparatus 1 according to the first embodiment.

In biological component measurement apparatus 1c according to the present embodiment, high thermal conductive film 30 includes the plurality of high thermal conductive film parts 31. The plurality of high thermal conductive film parts 31 each have a strip shape with long sides extending in the first direction (x direction) and short sides extending in the second direction (y direction). The plurality of high thermal conductive film parts 31 are arranged in the second direction (y direction) with the gap provided between high thermal conductive film parts 31.

This causes more excitation light 17 to be applied to sample 5, and the absorption heat of sample 5 increases accordingly. Furthermore, as high thermal conductive film 30, a material higher in thermal conductivity but lower in transmittance to excitation light 17 may be used. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1c to measure the biological component with improved accuracy.

Fourth Embodiment

Figure 9:
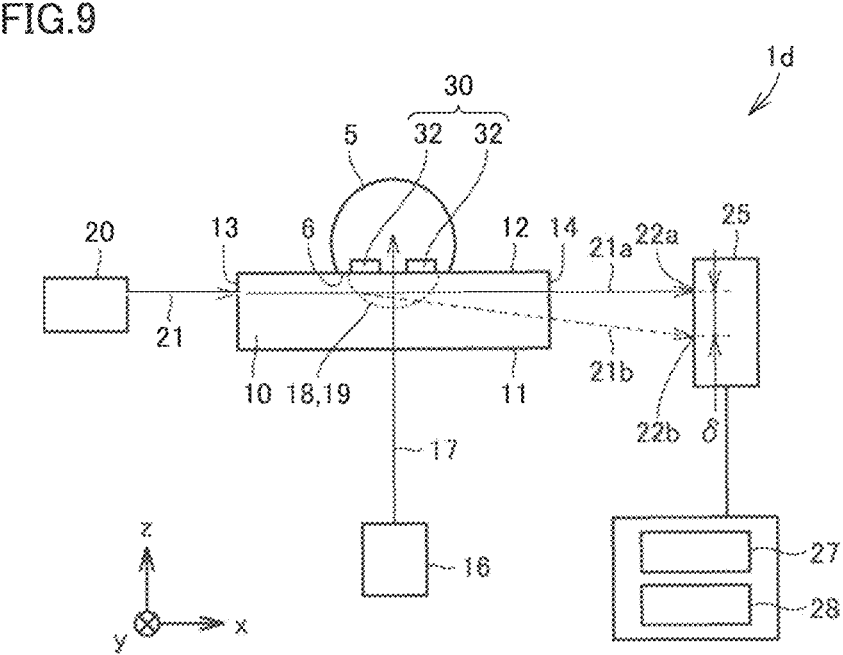
FIG. 9 is a diagram schematically illustrating a biological component measurement apparatus according to a fourth embodiment.
Figure 10:
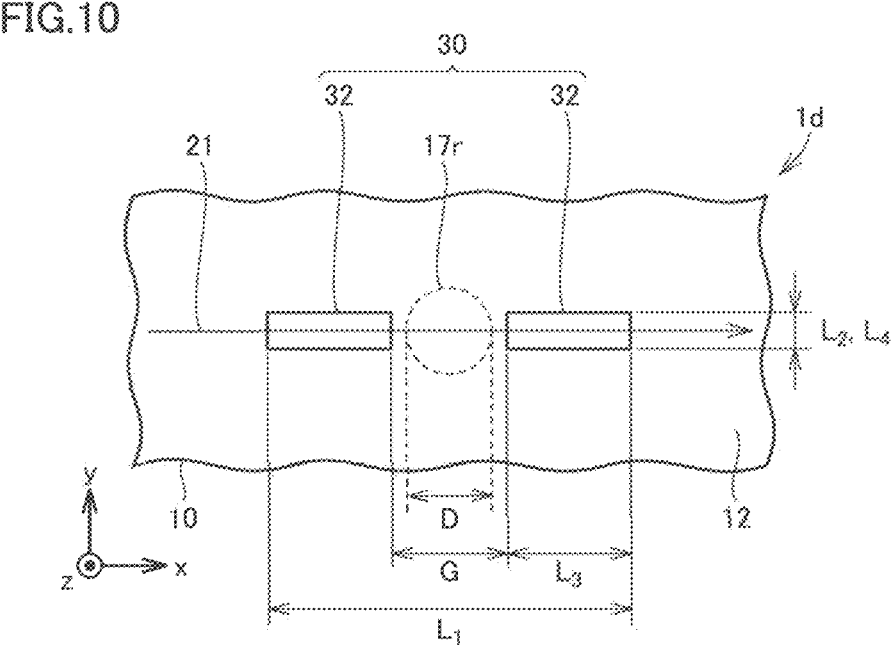
FIG. 10 is a partially enlarged plan view schematically illustrating the biological component measurement apparatus according to the fourth embodiment.

With reference to FIGS. 9 and 10, a biological component measurement apparatus 1d according to a fourth embodiment will be described. Biological component measurement apparatus 1d according to the present embodiment is similar in configuration to biological component measurement apparatus 1c according to the third embodiment, but is different mainly in the following points.

In biological component measurement apparatus 1d, high thermal conductive film 30 is separated from an entirety of irradiation part 17r in the first direction (x direction) in plan view of the sample placement surface (second surface 12). Specifically, high thermal conductive film 30 includes a plurality of high thermal conductive film parts 32. The plurality of high thermal conductive film parts 32 are arranged in the first direction (x direction) with a gap G provided between high thermal conductive film parts 32. In plan view of the sample placement surface (second surface 12), irradiation part 17r is interposed between the pair of high thermal conductive film parts 32 adjacent to each other. The pair of high thermal conductive film parts 32 adjacent to each other is provided adjacent to both sides of irradiation part 17r in the first direction (x direction) (specifically, a side in the positive first direction (+x direction) and a side in the negative first direction (−x direction)). Gap G between the pair of high thermal conductive film parts 32 adjacent to each other is greater than or equal to diameter D of irradiation part 17r. Specifically, gap G is greater than diameter D of irradiation part 17r. The plurality of high thermal conductive film parts 32 are separated from irradiation part 17r in the first direction (±x direction). Gap G may be less than or equal to 2.0 times diameter D of irradiation part 17r or may be less than or equal to 1.5 times diameter D of irradiation part 17r.

A third length $L_3$ of each of the plurality of high thermal conductive film parts 32 in the first direction (x direction) is greater than a fourth length $L_4$ of each of the plurality of high thermal conductive film parts 32 in the second direction (y direction) (second length $L_2$ of high thermal conductive film 30). The plurality of high thermal conductive film parts 32 each spread heat generated from sample 5 irradiated with excitation light 17 more in the first direction (x direction) than in the second direction (y direction). Third length $L_3$ of each of the plurality of high thermal conductive film parts 32 in the first direction (x direction) may be greater than diameter D of irradiation part 17r. Fourth length $L_4$ of each of the plurality of high thermal conductive film parts 32 in the second direction (y direction) may be less than diameter D of irradiation part 17r.

In plan view of the sample placement surface (second surface 12), since irradiation part 17r in its entirety is separated from high thermal conductive film 30, high thermal conductive film 30 may be formed of a material that is higher in thermal conductivity but lower in transmittance to excitation light 17 than the material of which a high thermal conductive film 30 according to the first embodiment 1 is made. High thermal conductive film 30 is formed of metal such as gold or copper.

Figure 11:
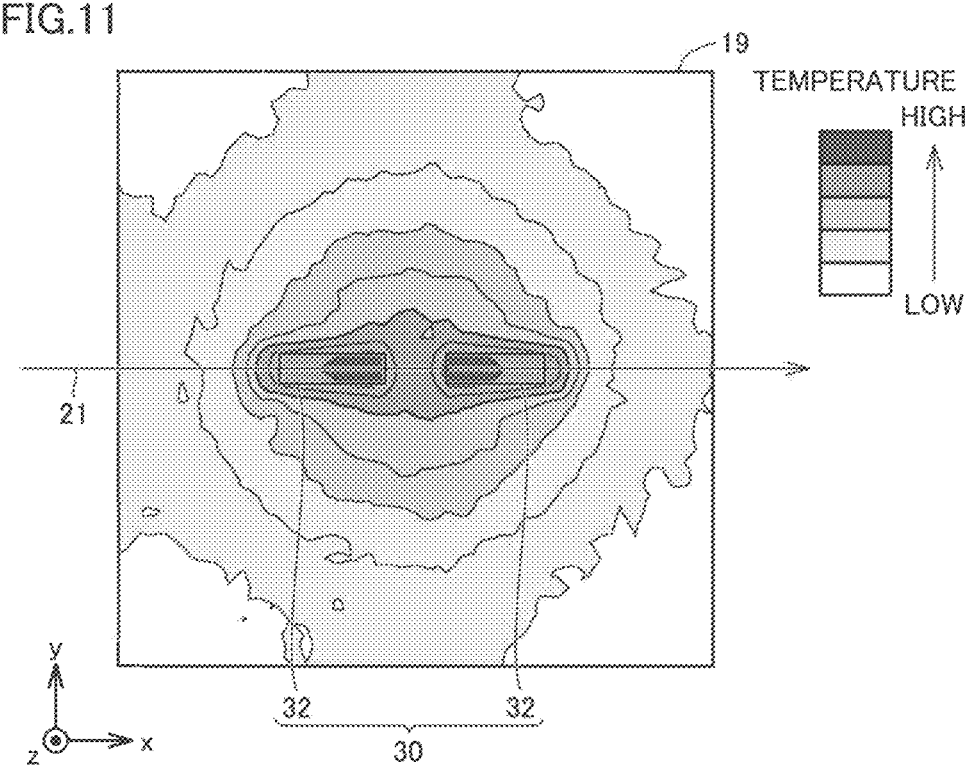
FIG. 11 is a diagram illustrating a result of simulation of temperature distribution in a temperature gradient region of an optical medium in a biological component measurement apparatus according to a fourth example of the fourth embodiment.

As illustrated in FIG. 11, high thermal conductive film 30 spreads heat generated from sample 5 irradiated with excitation light 17 more in the first direction (x direction) than in the second direction (y direction). Accordingly, the change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1d to measure the biological component with improved accuracy. Note that, in the fourth example of the present embodiment illustrated in FIG. 11, third length $L_3$ of each of the plurality of high thermal conductive film parts 32 is 80 μm, fourth length $L_4$ of each of the plurality of high thermal conductive film parts 32 in the second direction (y direction) is 20 μm, a thickness of each of the plurality of high thermal conductive film parts 32 is 10 μm, and gap G is 40 μm. In the fourth example, diameter D of excitation light 17 is 40 μm, and the width of probe light 21 is 20 μm.

Biological component measurement apparatus 1d according to the present embodiment produces the following effects in addition to the effects produced by biological component measurement apparatus 1c according to the third embodiment.

In biological component measurement apparatus 1d according to the present embodiment, high thermal conductive film 30 includes the plurality of high thermal conductive film parts 32. The plurality of high thermal conductive film parts 32 are separated from irradiation part 17r in the first direction (±x direction).

In biological component measurement apparatus 1d according to the present embodiment, high thermal conductive film 30 is separated from an entirety of irradiation part 17r in the first direction (x direction) in plan view of the sample placement surface (second surface 12).

This causes excitation light 17 that impinges on irradiation part 17r to be all applied to sample 5, and the absorption heat of sample 5 increases accordingly. Furthermore, as high thermal conductive film 30, a material higher in thermal conductivity but lower in transmittance to excitation light 17 may be used. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1d to measure the biological component with improved accuracy.

In biological component measurement apparatus 1d according to the present embodiment, high thermal conductive film 30 is formed of metal. This can make the thermal conductivity of high thermal conductive film 30 higher. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1d to measure the biological component with improved accuracy.

Fifth Embodiment

Figure 12:
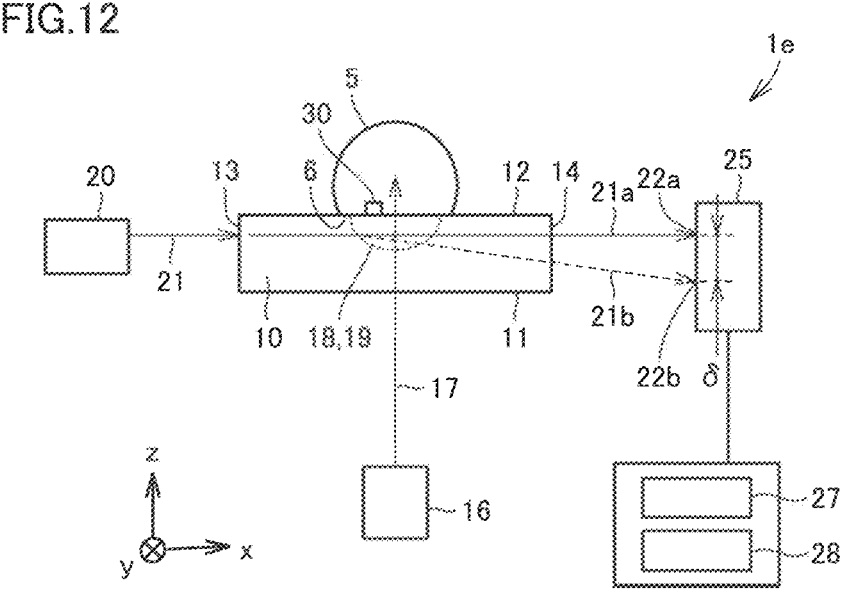
FIG. 12 is a diagram schematically illustrating a biological component measurement apparatus according to a fifth embodiment.
Figure 13:
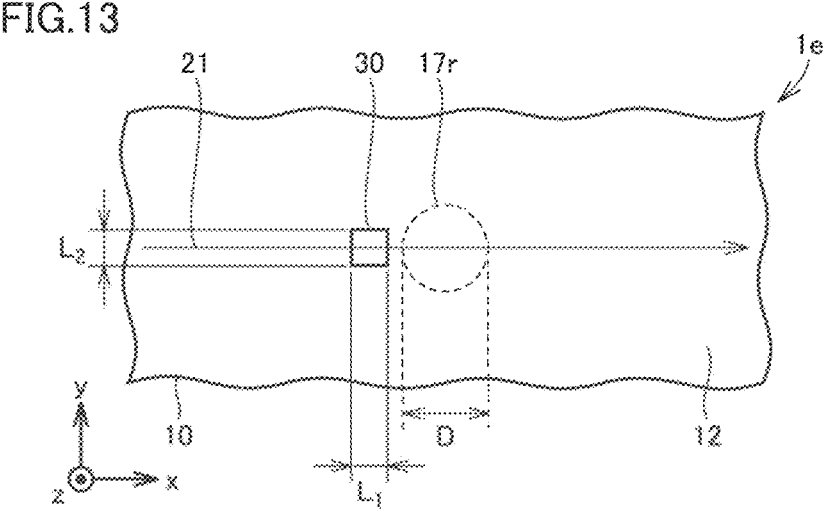
FIG. 13 is a partially enlarged plan view schematically illustrating the biological component measurement apparatus according to the fifth embodiment.

With reference to FIGS. 12 and 13, a biological component measurement apparatus 1e according to a fifth embodiment will be described. Biological component measurement apparatus 1e according to the present embodiment is similar in configuration to biological component measurement apparatus 1 according to the first embodiment, but is different mainly in the following points.

In biological component measurement apparatus 1e, high thermal conductive film 30 is disposed asymmetrically with respect to irradiation part 17r in the first direction (x direction) in plan view of the sample placement surface (second surface 12). In plan view of the sample placement surface (second surface 12), high thermal conductive film 30 is separated from an entirety of irradiation part 17r in the first direction (x direction). High thermal conductive film 30 is provided adjacent to only one side of irradiation part 17r in the first direction (x direction) (specifically, a side in the negative first direction (−x direction)).

A first length $L_1$ of high thermal conductive film 30 in the first direction (x direction) is greater than or equal to a second length $L_2$ of high thermal conductive film 30 in the second direction (y direction). Specifically, first length $L_1$ may be greater than second length $L_2$. First length $L_1$ may be less than diameter D of irradiation part 17r or may be equal to or less than diameter D of irradiation part 17r. First length $L_1$ may be greater than diameter D of irradiation part 17r. High thermal conductive film 30 is formed of metal such as gold or copper as in the fourth embodiment.

Figure 14:
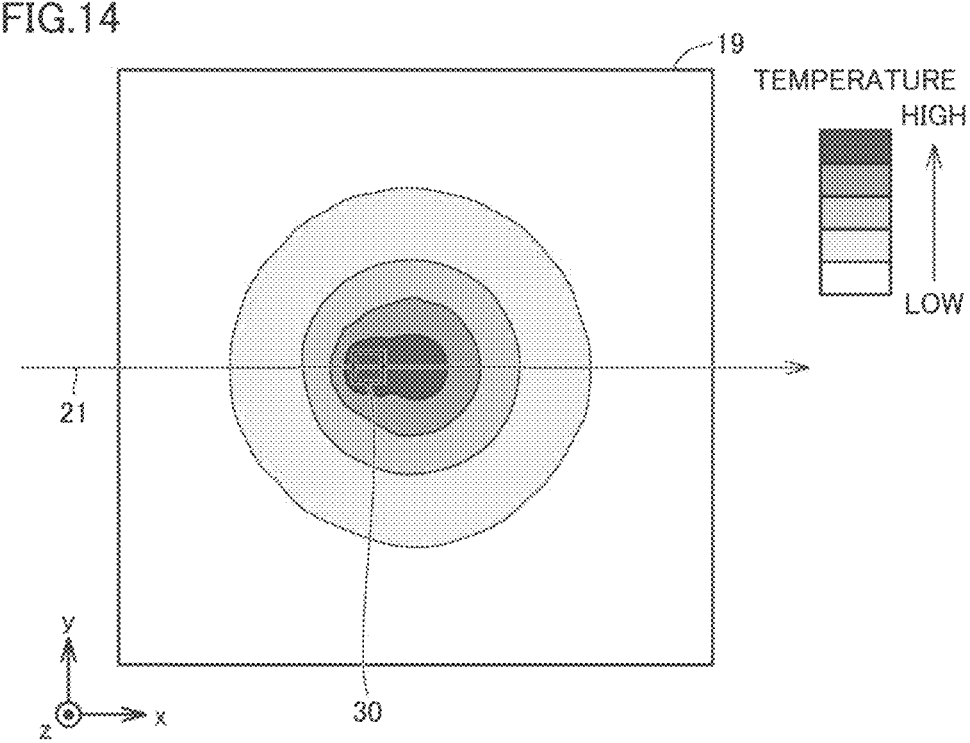
FIG. 14 is a diagram illustrating a result of simulation of temperature distribution in a temperature gradient region of an optical medium in a biological component measurement apparatus according to a fifth example of the fifth embodiment.

As illustrated in FIG. 14, high thermal conductive film 30 spreads heat generated from sample 5 irradiated with excitation light 17 more in the first direction (x direction) than in the second direction (y direction). Accordingly, the change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1e to measure the biological component with improved accuracy. Note that, in the fifth example of the present embodiment illustrated in FIG. 14, first length $L_1$ of high thermal conductive film 30 is 20 μm, second length $L_2$ of high thermal conductive film 30 is 20 μm, the thickness of high thermal conductive film 30 is 10 μm, and the gap between high thermal conductive film 30 and irradiation part 17r is 10 μm. In the fifth example, diameter D of excitation light 17 is 40 μm, and the width of probe light 21 is 20 μm.

Figure 15:
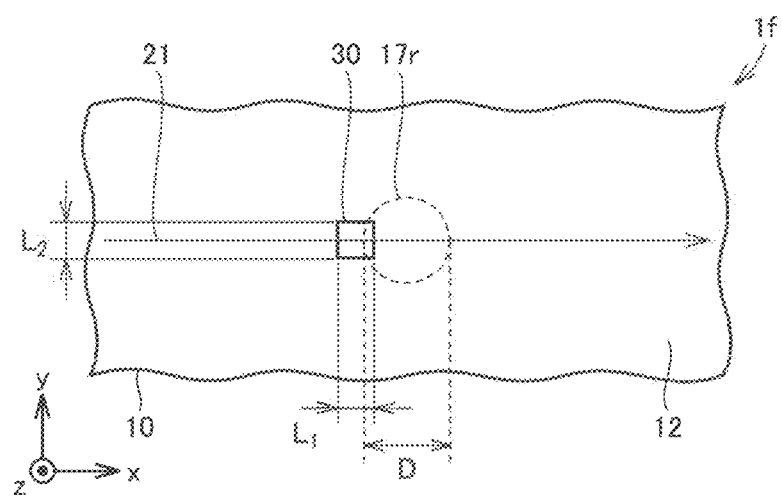
FIG. 15 is a partially enlarged plan view schematically illustrating a biological component measurement apparatus according to a modification of the fifth embodiment.

With reference to FIG. 15, a biological component measurement apparatus 1f according to a modification of the present embodiment will be described. In biological component measurement apparatus 1f, high thermal conductive film 30 overlaps irradiation part 17r in plan view of the sample placement surface (second surface 12).

Biological component measurement apparatuses 1e, 1f according to the present embodiment produce similar effects produced by biological component measurement apparatus 1 according to the first embodiment.

In biological component measurement apparatuses 1e, 1f according to the present embodiment, high thermal conductive film 30 is disposed asymmetrically with respect to irradiation part 17r in the first direction in plan view of the sample placement surface (second surface 12). Accordingly, the change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatuses 1e, 1f to measure the biological component with improved accuracy.

In biological component measurement apparatus 1e according to the present embodiment, high thermal conductive film 30 is separated from an entirety of irradiation part 17r in the first direction (x direction) in plan view of the sample placement surface (second surface 12). This causes excitation light 17 that impinges on irradiation part 17r to be all applied to sample 5, and the absorption heat of sample 5 increases accordingly. Furthermore, as high thermal conductive film 30, a material higher in thermal conductivity but lower in transmittance to excitation light 17 may be used. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1e to measure the biological component with improved accuracy.

In biological component measurement apparatuses 1e, 1f according to the present embodiment, high thermal conductive film 30 is formed of metal. This can make the thermal conductivity of high thermal conductive film 30 higher. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatuses 1e, 1f to measure the biological component with improved accuracy.

Sixth Embodiment

Figure 16:
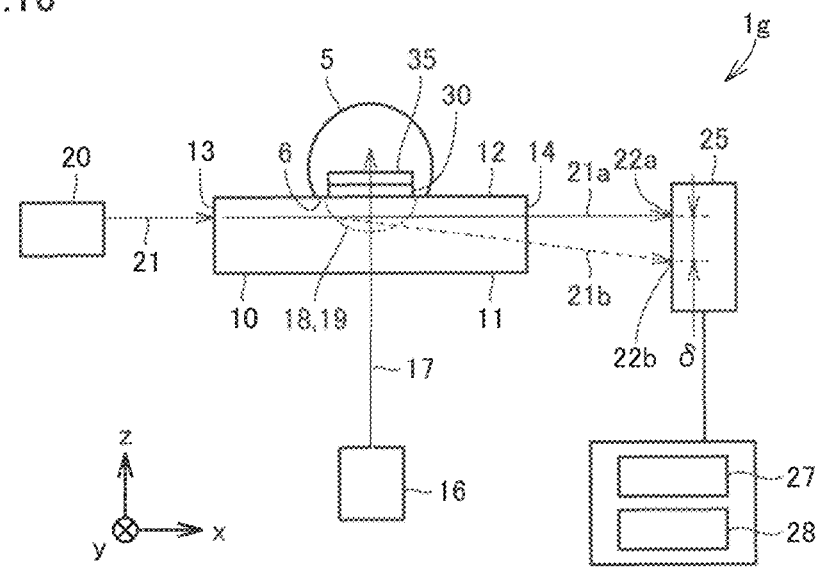
FIG. 16 is a diagram schematically illustrating a biological component measurement apparatus according to a sixth embodiment.

With reference to FIG. 16, a biological component measurement apparatus 1g according to a sixth embodiment will be described. Biological component measurement apparatus 1g according to the present embodiment is similar in configuration to biological component measurement apparatus 1 according to the first embodiment, but is different mainly in the following points.

Biological component measurement apparatus 1g further includes an anti-reflection film 35 provided on a distal surface of high thermal conductive film 30 from optical medium 10. Anti-reflection film 35 suppresses reflection of excitation light 17 at an interface between sample 5 and high thermal conductive film 30. Anti-reflection film 35 is formed of zinc selenide (ZnSe), zinc sulfide (ZnS), calcium fluoride ($CaF_2$), magnesium fluoride ($MgF_2$), potassium bromide (KBr), sodium chloride (NaCl), or a combination thereof.

Biological component measurement apparatus 1g according to the present embodiment produces the following effects in addition to the effects produced by biological component measurement apparatus 1 according to the first embodiment.

Biological component measurement apparatus 1g according to the present embodiment further includes anti-reflection film 35 provided on the distal surface of high thermal conductive film 30 from optical medium 10. This causes more excitation light 17 to be applied to sample 5, and the absorption heat of sample 5 increases accordingly. The change in temperature of the part (temperature gradient region 19) of optical medium 10 located around the optical path of probe light 21 becomes larger. The change in refractive index of the part (refractive index gradient region 18) of optical medium 10 located around the optical path of probe light 21 becomes larger. Displacement amount δ of probe light 21 detected by light position detector 25 becomes larger. This enables biological component measurement apparatus 1g to measure the biological component with improved accuracy.

Seventh Embodiment

Figure 17:
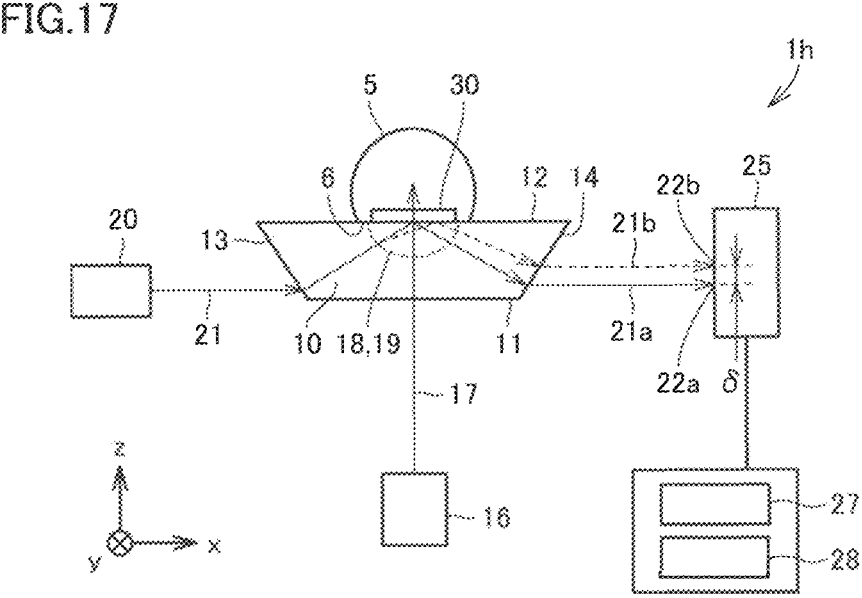
FIG. 17 is a diagram schematically illustrating a biological component measurement apparatus according to a seventh embodiment.

With reference to FIG. 17, a biological component measurement apparatus 1h according to a seventh embodiment will be described. Biological component measurement apparatus 1h according to the present embodiment is similar in configuration to biological component measurement apparatus 1 according to the first embodiment and produces similar effects, but is different mainly in the following points.

In biological component measurement apparatus 1h, third surface 13 is inclined from the incident direction of probe light 21. Fourth surface 14 is inclined from the outgoing direction of probe light 21. The outgoing direction of probe light 21 that outgoes from optical medium 10 may be parallel to the incident direction of probe light 21 that impinges on optical medium 10. Optical medium 10 may be, for example, a total internal reflection prism (TIR prism).

Probe light 21 impinges on optical medium 10 through third surface 13 of optical medium 10. Probe light 21 is refracted by third surface 13 and travels through optical medium 10 toward the interface between optical medium 10 (second surface 12) and sample 5. In plan view of the sample placement surface (second surface 12), the optical path of probe light 21 in optical medium 10 overlaps the part of the sample placement surface (second surface 12) irradiated with excitation light 17. Probe light 21 is totally internally reflected at the interface between optical medium 10 (second surface 12) and high thermal conductive film 30. While probe light 21 is traveling through optical medium 10, probe light 21 travels through refractive index gradient region 18 generated in optical medium 10 by the absorption heat of sample 5. Probe light 21 is refracted by refractive index gradient region 18, and the traveling direction of probe light 21 changes accordingly. Probe light 21 (first outgoing probe light 21a and second outgoing probe light 21b) outgoes from fourth surface 14 of optical medium 10.

It should be understood that the first to seventh embodiments and their modifications disclosed herein are illustrative in all respects and not restrictive. At least two of the first to seventh embodiments and their modifications disclosed herein may be combined as long as there is no inconsistency. The scope of the present disclosure is defined by the claims rather than the above description, and the present disclosure is intended to include the claims, equivalents of the claims, and all modifications within the scope.

REFERENCE SIGNS LIST

1, 1a, 1b, 1c, 1d, 1e, 1f, 1g, 1h: biological component measurement apparatus, 5: sample, 6: surface, 10: optical medium, 11: first surface, 12: second surface, 13: third surface, 14: fourth surface, 16: excitation light source, 17: excitation light, 17r: irradiation part, 18: refractive index gradient region, 19: temperature gradient region, 20: probe light source, 21: probe light, 21a: first outgoing probe light, 21b: second outgoing probe light, 22a: first position, 22b: second position, 25: light position detector, 27: displacement amount calculation unit, 28: biological component measurement unit, 30: high thermal conductive film, 31, 32: high thermal conductive film part, 33: opening, 35: anti-reflection film

The invention claimed is:

1. A biological component measurement apparatus comprising:
   an optical medium including a sample placement surface;
   a high thermal conductive film provided on the sample placement surface, the high thermal conductive film being higher in thermal conductivity than the optical medium;
   an excitation light source to emit, toward a sample placed on the sample placement surface and the high thermal conductive film, excitation light that travels through the optical medium;
   a probe light source to emit probe light that travels through the optical medium; and
   a light position detector to detect a position of the probe light outgoing from the optical medium.

2. The biological component measurement apparatus according to claim 1, wherein
   in plan view of the sample placement surface, an optical path of the probe light in the optical medium overlaps an irradiation part of the sample placement surface irradiated with the excitation light,
   the high thermal conductive film spreads heat generated from the sample irradiated with the excitation light more in a first direction than in a second direction,
   the first direction is a traveling direction of the probe light in the plan view of the sample placement surface, and
   the second direction is a direction orthogonal to the first direction in the plan view of the sample placement surface.

3. The biological component measurement apparatus according to claim 2, wherein
   in the plan view of the sample placement surface, the high thermal conductive film overlaps the probe light in the first direction.

4. The biological component measurement apparatus according to claim 2, wherein
   a length of the high thermal conductive film in the second direction is greater than a width of the probe light.

5. The biological component measurement apparatus according to claim 2, wherein
   in the plan view of the sample placement surface, the high thermal conductive film has a strip shape with long sides extending in the first direction and short sides extending in the second direction.

6. The biological component measurement apparatus according to claim 5, wherein
   in the plan view of the sample placement surface, the high thermal conductive film extends across the irradiation part in the first direction.

7. The biological component measurement apparatus according to claim 6, wherein
   a length of the high thermal conductive film in the second direction decreases toward the irradiation part.

8. The biological component measurement apparatus according to claim 6, wherein
   at least one opening is provided in a part of the high thermal conductive film that overlaps the irradiation part.

9. The biological component measurement apparatus according to claim 2, wherein
   the high thermal conductive film includes a plurality of high thermal conductive film parts, and
   the plurality of high thermal conductive film parts are separated from the irradiation part in the first direction.

10. The biological component measurement apparatus according to claim 2, wherein
    in the plan view of the sample placement surface, the high thermal conductive film is disposed asymmetrically with respect to the irradiation part in the first direction.

11. The biological component measurement apparatus according to claim 9, wherein
    in the plan view of the sample placement surface, the high thermal conductive film is separated from an entirety of the irradiation part in the first direction.

12. The biological component measurement apparatus according to claim 1, further comprising an anti-reflection film provided on a distal surface of the high thermal conductive film from the optical medium.

13. The biological component measurement apparatus according to claim 12, wherein
    the anti-reflection film is formed of zinc selenide, zinc sulfide, calcium fluoride, magnesium fluoride, potassium bromide, or sodium chloride.

14. The biological component measurement apparatus according to claim 1, wherein
    the high thermal conductive film is formed of silicon or germanium.

15. The biological component measurement apparatus according to claim 1, wherein
    the high thermal conductive film is formed of metal.

16. The biological component measurement apparatus according to claim 1, further comprising a displacement amount calculation circuit, wherein
    the light position detector outputs, to the displacement amount calculation circuit, a first position of the probe light when the sample is not irradiated with the excitation light and a second position of the probe light when the sample is irradiated with the excitation light, and
    the displacement amount calculation circuit calculates a displacement amount of the probe light corresponding to a distance between the first position and the second position.

17. The biological component measurement apparatus according to claim 16, further comprising a biological component measurement circuit to measure a biological component in the sample or on a surface of the sample based on the displacement amount.

18. The biological component measurement apparatus according to claim 1, wherein
    the excitation light is infrared light having a wavelength greater than or equal to 3 μm and less than or equal to 20 μm.

* * * * *